(12) United States Patent
Knapp

(10) Patent No.: US 7,740,183 B2
(45) Date of Patent: Jun. 22, 2010

(54) THERMOSTATIC MIXER WITH DEVICE FOR DYNAMIC REGULATION OF A WATER FLOW

(75) Inventor: Alfons Knapp, Biberach an der Riß (DE)

(73) Assignee: Masco Corporation of Indiana, Indianapolis, IN (US)

( * ) Notice: Subject to any disclaimer, the term of this patent is extended or adjusted under 35 U.S.C. 154(b) by 705 days.

(21) Appl. No.: 11/800,758

(22) Filed: May 7, 2007

(65) Prior Publication Data
US 2007/0290054 A1   Dec. 20, 2007

Related U.S. Application Data

(63) Continuation of application No. PCT/IB2005/003358, filed on Nov. 9, 2005.

(30) Foreign Application Priority Data
Nov. 9, 2004   (IT) ....................... TO 2004 A 0777

(51) Int. Cl.
 G05D 23/13 (2006.01)
 F16K 11/07 (2006.01)
 F16L 55/04 (2006.01)
(52) U.S. Cl. ................ 236/12.2; 236/12.17; 236/12.18; 137/625.48; 138/31

(58) Field of Classification Search ............. 236/12.16, 236/12.17, 12.18, 12.2, 12.21; 138/31; 137/625.4, 137/625.48
See application file for complete search history.

(56) References Cited

U.S. PATENT DOCUMENTS

| 3,388,861 | A | 6/1968 | Harding |
| 3,827,016 | A | 7/1974 | Knapp |
| 4,760,953 | A | 8/1988 | Trubert |
| 5,148,976 | A | 9/1992 | Reid |
| 6,471,132 | B1 | 10/2002 | Knapp |
| 2004/0089728 | A1 | 5/2004 | Nember |

FOREIGN PATENT DOCUMENTS

| EP | 0 767 332 | 4/1997 |
| WO | 02/03159 | 1/2002 |

*Primary Examiner*—Chen-Wen Jiang
(74) *Attorney, Agent, or Firm*—Brinks Hofer Gilson & Lione

(57) ABSTRACT

The disclosure relates to a thermostatic mixer, including a device for the dynamic regulation of the cold water flow which supplies the mixer. A resistance is generated to the flow of cold water supplied to the thermostatic mixer when small flows of mixed water are required, and said resistance is lifted or reduced when large flows of mixed water are required. Said operation is automatically carried out by devices for dynamic regulation of flow, whereby the flow cross-section provided for the incoming cold water is reduced when the drawn flow is reduced and a larger flow cross-section reestablished when a larger flow is required.

7 Claims, 3 Drawing Sheets

THERMOSTATIC MIXER WITH DEVICE FOR DYNAMIC REGULATION OF A WATER FLOW

CROSS-REFERENCE TO RELATED APPLICATIONS

This application is a continuation of International Application No. PCT/IB2005/003358 filed on Nov. 9, 2005, which claims the benefit of Italian Patent Application No. TO 2004 A 000777 filed Nov. 9, 2004. The disclosures of the above applications are incorporated herein by reference.

FIELD

The present disclosure relates to a thermostatic mixer comprising a device for the dynamic regulation of the cold water flow supplying the mixer.

BACKGROUND

The statements in this section merely provide background information related to the present disclosure and may not constitute prior art.

Thermostatic mixers that are suited to handle a large flow rate generally do not function if the flow rate required from them is considerably smaller than the maximum flow rate they are designed for, as occurs, for example, when a thermostatic mixer suited to supply a fixture comprising a plurality of showers is used to supply a single shower. Under these circumstances, the thermostatic mixers lose their stability and start to vibrate so that the water flow drawn from them is subject to constant fluctuations in the ratio between cold water and warm water and therefore sustains temperature fluctuations, which are uncomfortable for the user and may become dangerous. This disadvantage may be corrected by opposing a resistance to the cold water flow fed into the thermostatic mixer when small flow rates of mixed water are supposed to be pumped and by suppressing or reducing this resistance when large flow rates of mixed water are supposed to be pumped. This operation is carried out automatically by devices for dynamic flow regulation, which are designed to reduce the passage cross-section provided to the arriving cold water when the accommodated flow rate is reduced and to restore a larger passage cross-section when an increased flow rate is required.

Nevertheless, the known devices for dynamic flow regulation are generally associated with various disadvantages. Above all, in light of their design and their dimensions, they must be elements that can be added to the fixture in series connection to the feed pipe of the cold water to the mixer and which cannot be installed in the mixer itself. Therefore, the load of the recuperating spring requires adjustment as a function of the inflow pressure of the cold water for the device to function properly. Consequently, during installation the device must be adapted to the pressure conditions prevailing in the system, and the function of the device is no longer appropriate when considerable fluctuations in the cold water inflow pressure occur.

SUMMARY

The main object of the present invention is to create a thermostatic mixer comprising a device for the dynamic regulation of the cold feed water, the configuration of which must be so simple that it can be installed in the thermostatic mixer, and the function of which must be largely independent from the inflow pressure, so that the device must not require any adjustments during the course of its installation, and may not function irregularly even when considerable variations in the inflow pressure occur.

Another object of the present invention relates to the creation of such a thermostatic mixer, which comprises a device for dynamic flow regulation that has a simple design, is economical in comparison with a similar thermostatic mixer, which per se does not have a device for dynamic flow regulation and is equipped with a separate device for dynamic flow regulation, and guarantees great reliability and a long service life.

These tasks are achieved according to the invention by means of a thermostatic mixer, comprising in one body a feed passage for the cold water, a feed passage for the warm water, and a discharge passage for the mixed water, a slide designed for sliding in axial translation inside the body and for narrowing the feed passages for the warm water and for the cold water in opposite directions in order to change their mixing ratio, an expansion thermocouple connected to the slide for actuation of the same and extending in the discharge passage for the mixed water, a spring acting on the thermocouple and the device body, means for adjusting the idle position of the thermocouple, and a rod connecting the thermocouple and the means for adjusting the position of the same, characterized in that an annular feed chamber is formed in the area of the cold water feed passage inside the slide, that furthermore the mixer has a hollow cylinder disposed inside the slide and provided for displacement in axial translation between a first position, in which it narrows the passage between the annular chamber and the space between the slide and the piston, and a second position, in which the piston does not narrow this passage, that the mixer comprises a second spring acting between the slide and the piston in such a direction that it acts on the piston toward the first position, that the piston is provided with reduced radial passages penetrating it and located in the region of the annular feed chamber when the piston is in its first position, and that the piston has a transversal wall separating the space inside the piston into an intermediate chamber and a discharge chamber and in which an axial limited flow passage is located, which is penetrated by the rod for connection between the thermocouple and the means for adjusting the position of the same.

In this way, the piston reduces the inflow of the mixer only for cold water when the piston is in its first position (resting) and allows a flow with reduced flow rate which, despite the fact that it is considerably smaller than the one the thermostatic mixer is designed for, due to the presence of the restriction of the cold water inflow, does not cause any functional problems of the thermostatic mixer.

The pressure created inside the intermediate chamber is defined by the pressure decline experienced by the flow while passing from the feed chamber through the restricted radial passages to the intermediate chamber, and the pressure present inside the discharge chamber is smaller than the pressure mentioned above due to the pressure decline experienced by the flow while passing through the axial limited passage present in the transversal piston wall. The effects exerted on the piston in the axial direction and in the opposite direction, as well as the one exerted by the recuperating spring, substantially depend on the difference of the pressure present inside the intermediate chamber and that present inside the discharge chamber, this pressure difference acting on the transversal section of the piston and tending to overcome the force of the recuperating spring. Adequate dimensioning with respect to the cross-sections of the limited passages provided in the piston shell, the free cross-section of the limited passage provided in the transversal wall of the piston, and the force of the recuperating spring in turn make it possible that the piston is not displaced from its first position into its second position as long as a flow is drawn that is smaller than the maximum flow that can cause instability in the thermostatic mixer.

However, when a flow that is greater than the one defined above is required from the discharge chamber, the pressure present inside the feed chamber drops due to the pressure decline experienced by this larger flow while passing the axial limited passage provided in the transversal piston wall, and the pressure difference acting on the piston increases and overcomes the force of the recuperating spring; then, the piston is displaced into its second position, as a result of which it releases the flow passage from the feed chamber into the intermediate chamber and then into the discharge chamber.

Since what controls and/or regulates the displacement of the piston is not the absolute pressure present inside the chambers of the device, but the pressure difference between the intermediate chamber and the discharge chamber, which depends on the flow and the resistance opposed to it, but not on the absolute pressure, the function of the device is largely independent from the inflow pressure, and in turn the device does not require any adaptation during the course of its installation and does not exhibit any irregularities in its function, even if the inflow pressure varies considerably.

In light of the great simplicity of the above-described device for dynamic flow regulation and its reduced dimensions, the installation in the thermostatic mixer is not associated with any problems and according to the invention enables the production of a thermostatic mixer comprising the device for dynamic flow regulation, which according to the state of the art would have to represent a separate attachment.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
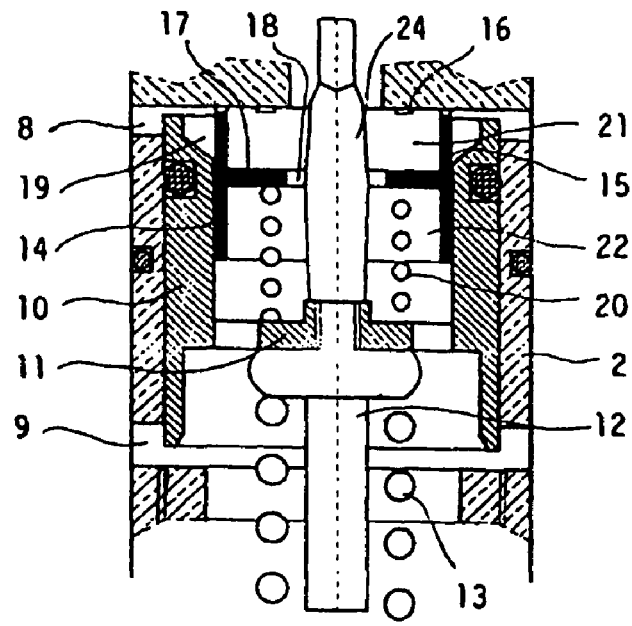
FIG. 2 shows only the components of the mixer according to FIG. 1 relating to the invention, in the idle state and/or in the state of withdrawal with a reduced flow rate.
Figure 3:
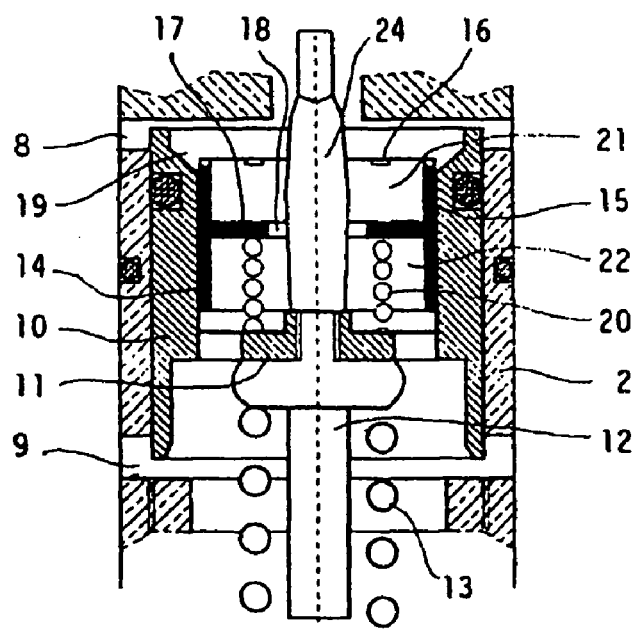
FIG. 3 shows the same components of the mixer according to FIG. 2, however in the state of withdrawal with an increased flow rate.
Figure 4:
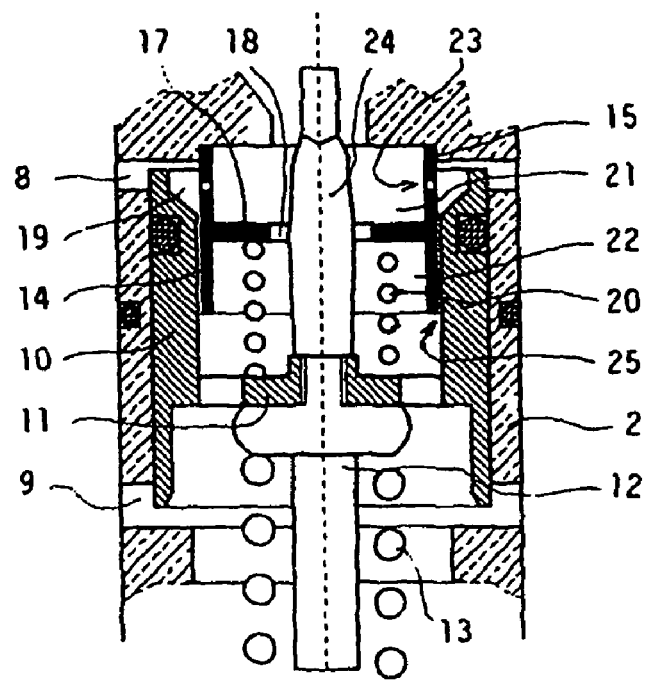
Figure 5:
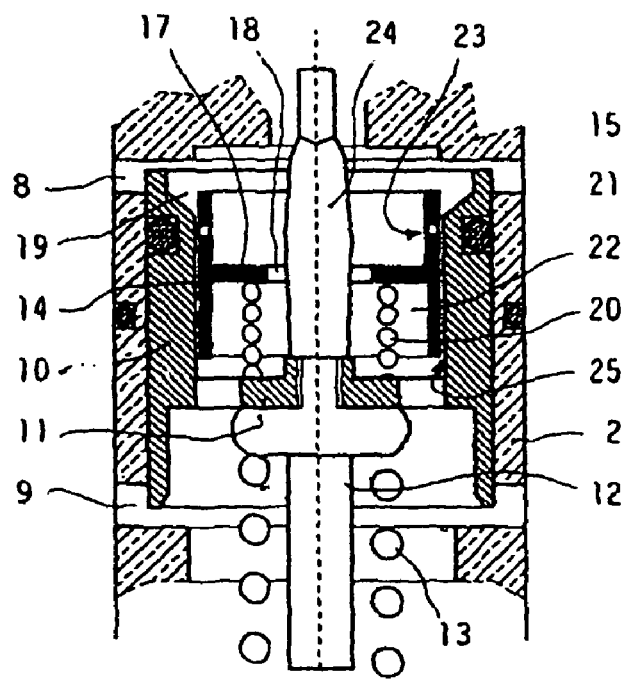

FIGS. 4 and 5 equivalent to FIGS. 2 and 3 show another embodiment of the device according to the invention.

DETAILED DESCRIPTION

The following description is merely exemplary in nature and is not intended to limit the present disclosure, application, or uses.

Figure 1:
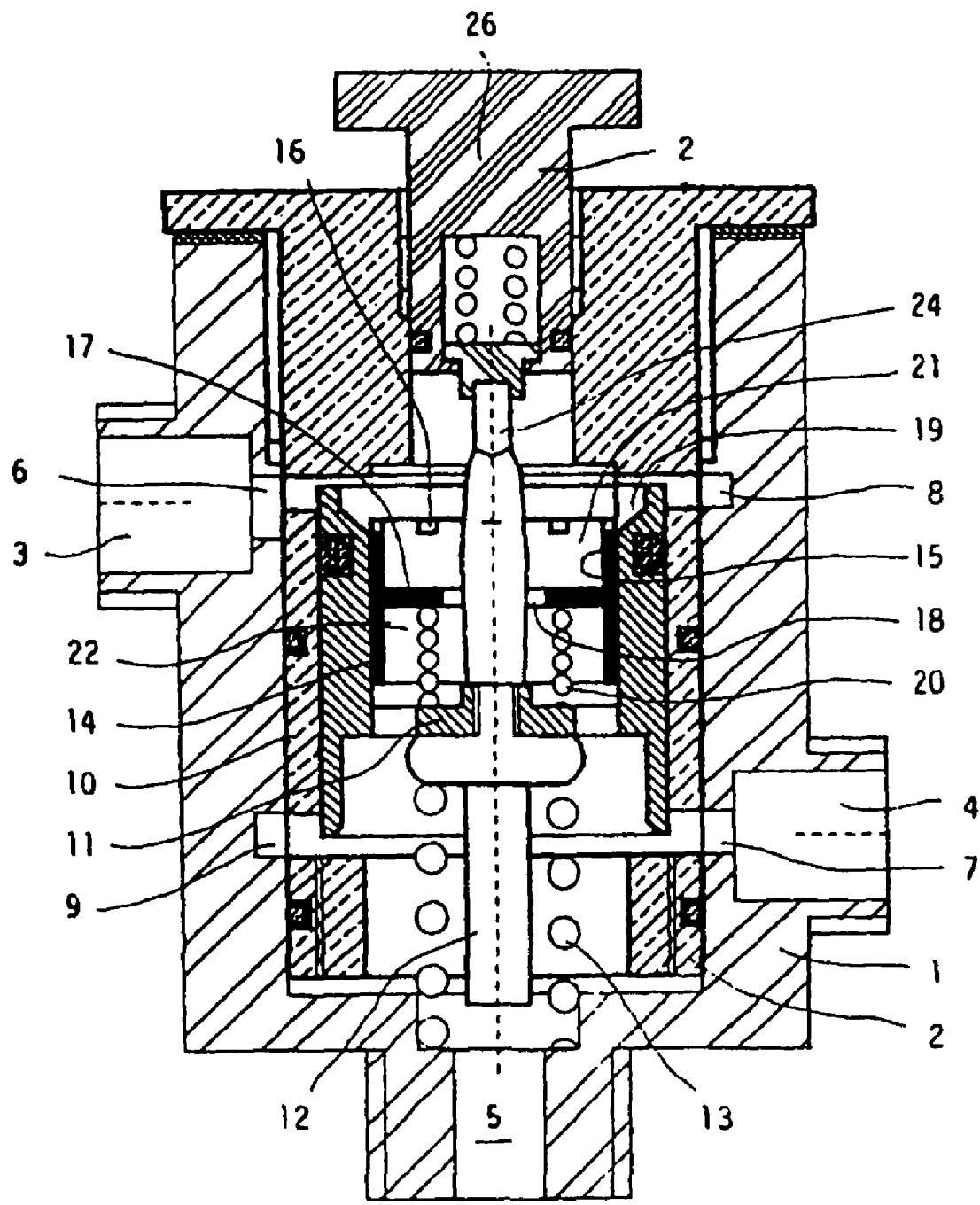
FIG. 1 shows an axial cross-sectional view of a thermostatic mixer according to the invention, which comprises a device for dynamic flow regulation.

In FIG. 1, a thermostatic mixer according to the invention is shown in an axial cross-sectional view, which mixer comprises a device for the dynamic regulation of an entering cold water flow, with the function of stabilizing the operation of the thermostatic mixer. The mixer comprises a body 1, which on top is closed in a plug-like manner by the upper part of the body 2 of a cartridge inserted into the body 1. The body 1 forms an inflow connector 3 for the cold water, an inflow connector 4 for the warm water and an outflow connector 5 for the mixed water. The inflow connector 3 for the cold water and the inflow connector 4 for the warm water each extend into annular feed passages 6 and 7 inside the body 1, and the feed passages 8 and/or 9 formed in the cartridge 2 each correspond to these annular passages. On the inside of the cartridge 2, an axially displaceable slide 10 is mounted, which is designed to narrow the feed passages 8 and 9 in opposite directions in order to modify the flow rates of the cold water and of the warm water entering the slide 10 in opposite directions, thus modifying the mixing ratio and temperature of the mixed water sent to the outflow connector 5. The slide 10 has a transversal wall 11 penetrated by passages, to which wall an expansion thermocouple 12 is attached, extending toward the outflow connector 5 of the mixed water and expanding depending on the temperature of the mixed water, thus displacing the slide 10. A spring 13 acts on this configuration, while a control and safety device 26, which is provided on the opposite side of the spring 13 and is accessible to the user for regulation purposes, defines the idle state of the slide 10 by means of a rod 24. Suitable gaskets are provided in a common way where water tightness must exist and are not described in further detail. The components described so far represent the conventional design of a thermostatic mixer, wherein this design and its function are known to the person skilled in the art.

According to the invention, the slide 10 forms an annular feed chamber 19 for the cold water in the region of the feed passages 8, and an axially displaceable hollow cylinder 14 is mounted on the inside of the slide 10, which cylinder has a cylindrical shell 15 interspersed with limited passages 16. The cylinder 14 can be displaced between a first position (according to the drawing shifted upwards), in which the shell 15 narrows the passage from the annular feed chamber 19 into the inside of the slide 10 and the hollow cylinder 14, and a second position (according to the drawing shifted downwards), in which the shell 15 does not narrow the passage.

Furthermore, the hollow cylinder 14 has a transversal wall 17 in which an axially limited passage 18 opens, which is interspersed with the rod 24 that connects the thermocouple 12 to the regulating means 26. A recuperating spring 20 is provided between the transversal wall 17 of the cylinder 14 and the transversal wall 11 of the slide 10, which spring acts on the cylinder 14 toward the first position, which is the idle state.

The shell 15 and transversal wall 17 of the cylinder 14 define an intermediate chamber 21, while a discharge chamber 22 is defined between the transversal wall 17 of the cylinder 14 and the transversal wall 11 of the slide 10.

It should be noted that in the idle state the limited radial passages 16 allow limited flow to travel from the feed chamber 19 to the intermediate chamber 21 located inside the piston and to continue through the axial passage 18 and the discharge chamber 22 to the outflow connector 5, thus passing through the entire device. When such a limited flow is present, the pressure in the feed chamber 19 is the inflow pressure of the cold water, the pressure in the intermediate chamber 21 is smaller than the inflow pressure due to the pressure decline experienced by the flow by passing through the limited passages 16, and the pressure inside the discharge chamber 22 is further reduced due to the pressure decline experienced by the flow by passing through the axial limited passage 18. Due to the difference between the pressure present in the intermediate chamber 21 and the reduced pressure present in the discharge chamber 22, the piston is acted upon such that it is displaced away from the feed chamber 19 and the recuperating spring 20 acts against this process.

In contrast, the piston 14 is practically not influenced by the feed pressure present in the feed chamber 19 since this pressure acts on the shell 15 of the piston 14 in the radial direction. On the other hand, the pressure declines experienced by the flow depend solely on the intensity of the flow and on the resistances opposed to it and not on the absolute pressure value. In turn, the behavior of the piston 14 is not significantly influenced by the inflow pressure value and its fluctuations.

The limited radial passages 16, the limited axial passage 18 and the recuperating spring 20 must be proportioned relative to one another so that the effect of the spring 20 corresponds substantially to the force that tends to displace the piston 14 from the first position into the second position when the maximum flow rate is withdrawn, which may cause instability in a thermostatic mixer. The piston 14 in turn maintains its first position illustrated in FIG. 2 as long as the requested flow rate stays below the afore-mentioned maximum value.

However, when a flow rate that is larger than the above-defined maximum rate is requested by the outflow connector 5, the pressure inside the discharge chamber 22 is reduced and the pressure difference acting on the piston 14 exceeds the force of the recuperating spring 22. Now, the piston 14 is displaced into its second opening position illustrated in FIG. 3. The shell section 15 stops narrowing the passage between the feed chamber 18 and the intermediate chamber 21 and the flow passage from the feed chamber 18 to the discharge chamber 22 is substantially free.

If thereafter the requested flow rate is reduced again or completely stopped, the effect of the recuperating spring 22 again exceeds the pressure difference acting on the piston 14 and displaces the piston again into its first closing position according to FIG. 2.

In the embodiment described above, the limited radial passages 16 are formed by small recesses provided on the edge of the end of the shell section 15 of the piston 14. In this case, it is advantageous for the shell section 15 to be thin in order to minimize a reduced and generally negligible component of the inflow pressure, which acts on the piston in the axial direction while affecting the cross-section of the limited radial passages 16.

FIGS. 4 and 5 show another embodiment of the device according to the invention. In these figures, parts that are identical to or that correspond to the parts in the first embodiment have been denoted by the same reference numerals.

The second embodiment according to FIGS. 4 and 5 differs from the previous by the fact that the limited passages between the feed chamber 18 and the intermediate chamber 21 consist of one or more small holes 23, which are provided in the shell section 15, and not of small recesses 16, which are provided on the edge of the end of the shell section 15 of the piston 14. In this case, the negligible component of the inflow pressure, which in the previous embodiment acts on the piston in the axial direction, is missing, and it is of no meaning that the shell section 15 of the piston 14 should be thin.

FIGS. 4 and 5 also show that a small intermediate space 25 between the piston 14 and the slide 10 may be provided. This intermediate space forms a limited passage and may interact with the effect of the limited passages 16 or 23 or optionally take over their function completely.

As is apparent from the above, the invention enables the implementation of a thermostatic mixer comprising a device for the dynamic regulation of cold water inflow, which device is practically not sensitive to the fluctuations of the inflow pressure and stabilizes the function of the thermostatic mixer. It is not necessary to adjust the force of the recuperating spring as a function of the inflow pressure present inside the fixture, and no defect whatsoever can be observed in the functioning of the device even if, for whatever reason, this inflow pressure varies to a larger extent.

It should be noted that the invention is not limited to the embodiments described and illustrated as examples. A large variety of modifications have been described and more are part of the knowledge of the person skilled in the art. These and further modifications as well as any replacement by technical equivalents may be added to the description and figures, without leaving the scope of protection of the invention and of the present patent.

What is claimed is:

1. A thermostatic mixer, comprising one body, which is provided with a feed passage for cold water, a feed passage for warm water, and a discharge passage for mixed water, a slide, which is provided for displacement in axial translation in the body and for narrowing the feed passages for the warm water and for the cold water in opposite directions, thus changing their mixing ratio, an expansion thermocouple, which is connected to the slide for actuating the same and extends in the discharge passage for the mixed water, a spring acting on the thermocouple and the device body, means for adjusting the idle position of the thermocouple, and a rod connecting the thermocouple and the means for adjusting the position of the same, characterized in that on the inside of the slide, in the region of the feed passage for the cold water, an annular feed chamber is formed, in that the mixer additionally comprises a hollow cylinder, which is disposed on the inside of the slide and designed for displacement in axial translation between a first position, in which it narrows the passage between the annular chamber and the space inside the slide and the piston, and a second position, in which the piston does not narrow this passage, in that the mixer comprises a second spring acting between the slide and the piston in such a direction that it acts on the piston toward the first position, in that the piston is provided with limited radial passages penetrating it and located in the region of the annular feed chamber when the piston is in its first position, and in that the piston comprises a transversal wall, which separates the space inside the piston into an intermediate chamber and a discharge chamber and in which an axial limited flow passage is provided, which is penetrated by the rod for connection between the thermocouple and the means for adjusting the position of the same.

2. The thermostatic mixer according to claim 1, characterized in that the limited radial passages, the axial passage provided in the transversal wall of the piston, and the recuperating spring are proportioned relative to one another such that the effect of the recuperating spring substantially corresponds to the force, which tends to displace the piston from the first position to the second position when the maximum flow rate is drawn, which may cause instability of the thermostatic mixer.

3. The thermostatic mixer according to claim 1, characterized in that the piston comprises a shell section in which the limited passages are provided.

4. The thermostatic mixer according to claim 3, characterized in that the limited passages are formed by small recesses, which are provided on the edge of the shell end.

5. The thermostatic mixer according to claim 4, characterized in that the shell section is thin.

6. The thermostatic mixer according to claim 3, characterized in that the limited passages are formed by holes provided in the shell.

7. The thermostatic mixer according to claim 1, characterized in that in addition to or instead of the limited passages a small intermediate space is provided between the slide and the piston.

* * * * *